(12) United States Patent
Zarak

(10) Patent No.: US 8,720,510 B2
(45) Date of Patent: May 13, 2014

(54) PATCH HAVING REINFORCEMENTS WITH STAGGERED ENDS

(75) Inventor: Cesar Zarak, Simpsonville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 410 days.

(21) Appl. No.: 13/001,412

(22) PCT Filed: Jun. 27, 2008

(86) PCT No.: PCT/US2008/068567
§ 371 (c)(1),
(2), (4) Date: Dec. 24, 2010

(87) PCT Pub. No.: WO2009/157944
PCT Pub. Date: Dec. 30, 2009

(65) Prior Publication Data
US 2011/0108177 A1    May 12, 2011

(51) Int. Cl.
*B29C 73/10*    (2006.01)
(52) U.S. Cl.
USPC .......................................... 152/367; 156/97
(58) Field of Classification Search
CPC ..................................................... B29C 73/10
USPC .................... 152/367–373; 156/97
See application file for complete search history.

(56) References Cited

U.S. PATENT DOCUMENTS

| | | | |
|---|---|---|---|
| 1,591,817 A | 7/1926 | Hawkinson | |
| 2,547,487 A | 4/1951 | Penney | |
| 2,585,635 A | 2/1952 | Dibble | |
| 2,596,179 A | 5/1952 | Seymour | |
| 2,638,955 A | 5/1953 | Gruber | |
| 2,833,327 A | 5/1958 | Boyce | |
| 3,004,580 A | 10/1961 | Chambers et al. | |
| 3,080,907 A | 3/1963 | Barrett | |
| 3,095,342 A | 6/1963 | Kraly | |
| 3,133,586 A | 5/1964 | Wolfe | |
| 3,143,156 A | 8/1964 | Fagert et al. | |
| 3,160,194 A | 12/1964 | Barrett | |
| 3,267,981 A | 8/1966 | Bennies | |
| 3,282,319 A * | 11/1966 | Barnett | 152/367 |
| 3,299,936 A * | 1/1967 | Van Den Berg | 152/367 |
| 3,306,332 A | 2/1967 | Williams et al. | |
| 3,332,466 A | 7/1967 | Wolfe | |
| 3,448,784 A | 6/1969 | Sons, Jr | |

(Continued)

FOREIGN PATENT DOCUMENTS

| | | |
|---|---|---|
| CA | 1335560 | 5/1995 |
| CA | 2354284 | 1/2003 |

(Continued)

OTHER PUBLICATIONS

English machine translation of DE3515944, dated Nov. 1986.*

(Continued)

*Primary Examiner* — Justin Fischer
*Assistant Examiner* — Robert Dye
(74) *Attorney, Agent, or Firm* — Hahn Loeser & Parks, LLP; Daniel J. Smola

(57) ABSTRACT

A tire patch for repairing an associated vehicle tire includes a patch body configured to overlay a portion of the associated vehicle tire, and a plurality of reinforcements received at least partially within the patch body, each reinforcement of the plurality having a first ending and a second ending, wherein the plurality of reinforcements are arranged to provide a staggered arrangement of the first endings.

20 Claims, 6 Drawing Sheets

(56) References Cited

U.S. PATENT DOCUMENTS

| | | | |
|---|---|---|---|
| 3,648,750 | A | 3/1972 | Felden |
| 3,719,218 | A * | 3/1973 | Leybourne, III ............. 152/527 |
| 3,730,247 | A * | 5/1973 | White ........................... 152/367 |
| 4,285,382 | A | 8/1981 | DiRocco et al. |
| 4,317,692 | A | 3/1982 | Niconchuk |
| 4,333,508 | A | 6/1982 | DiRocco et al. |
| 4,375,231 | A | 3/1983 | Bubik et al. |
| 4,385,651 | A | 5/1983 | Arquilla |
| 4,399,854 | A | 8/1983 | DiRocco et al. |
| 4,408,649 | A | 10/1983 | Litterini |
| 4,424,088 | A | 1/1984 | Durif |
| 4,434,832 | A | 3/1984 | Koch et al. |
| 4,540,035 | A | 9/1985 | Roberts |
| 4,696,332 | A | 9/1987 | Koch |
| 4,718,469 | A | 1/1988 | Koch et al. |
| 4,836,930 | A | 6/1989 | Hill |
| 4,923,543 | A | 5/1990 | Koch et al. |
| 5,139,840 | A | 8/1992 | Ferrara |
| 5,247,981 | A | 9/1993 | Benedicto, Jr. et al. |
| 5,335,707 | A | 8/1994 | Sano et al. |
| 5,695,577 | A | 12/1997 | Ferrara |
| 5,713,842 | A | 2/1998 | Kay |
| 5,830,295 | A | 11/1998 | Hobbs et al. |
| 6,026,878 | A | 2/2000 | Zhang et al. |
| 6,386,255 | B1 | 5/2002 | Majumdar et al. |
| 6,426,129 | B1 | 7/2002 | Kalwara et al. |
| 6,438,932 | B1 | 8/2002 | De Vos et al. |
| 7,027,877 | B2 | 4/2006 | Dupelle et al. |
| 2006/0037507 | A1 | 2/2006 | Trigg et al. |
| 2008/0142137 | A1 | 6/2008 | Scheungraber |
| 2009/0229737 | A1 | 9/2009 | Fujiwara et al. |

FOREIGN PATENT DOCUMENTS

| | | | |
|---|---|---|---|
| DE | 1141552 | B | 12/1962 |
| DE | 1225981 | B | 9/1966 |
| DE | 1244003 | B | 7/1967 |
| DE | 1912469 | A1 | 9/1970 |
| DE | 3515944 | * | 11/1986 |
| DE | 3515944 | A1 | 11/1986 |
| DE | 3926946 | A1 | 1/1991 |
| DE | 29610697 | B | 9/1996 |
| EP | 0025180 | A2 | 3/1981 |
| EP | 0279901 | | 8/1988 |
| EP | 0353313 | A1 | 2/1990 |
| FR | 634317 | A | 2/1928 |
| FR | 1203408 | A | 1/1960 |
| FR | 1226595 | A | 7/1960 |
| FR | 1287560 | A | 3/1962 |
| GB | 839087 | A | 6/1960 |
| GB | 1082327 | A | 9/1967 |
| GB | 1280210 | A | 7/1972 |
| JP | 63041209 | A | 2/1988 |
| JP | 0216209 | | 6/1990 |
| JP | H07-137155 | A | 5/1995 |
| JP | H07-172123 | A | 11/1995 |
| JP | 8244124 | A | 9/1996 |
| JP | 2000-512230 | A | 9/2000 |
| NL | 9302004 | A | 6/1995 |
| RU | 2176954 | C1 | 12/2001 |
| SU | 41858 | A1 | 2/1935 |
| SU | 238143 | A1 | 2/1969 |
| SU | 1648807 | A1 | 5/1991 |
| SU | 1708666 | A1 | 1/1992 |
| WO | 85/04619 | A1 | 10/1985 |
| WO | 2005/051259 | A2 | 6/2005 |
| WO | 2006/094775 | A1 | 9/2006 |

OTHER PUBLICATIONS

English machine translation of DE1912469, no date.*
English translation of DE1912469, dated Sep. 1970.*
DE3926946A1—English machine translation obtained from European Patent Office website (http://translationportal.epo.org) on Aug. 3, 2012, 2 pages.
PCT/US2008/068498 International Search Report dated Oct. 2, 2008.
PCT/US2008/068498 International Written Opinion dated Oct. 2, 2008.
PCT/US2008/068567 International Search Report dated Oct. 2, 2008.
PCT/US2008/068567 International Written Opinion dated Oct. 2, 2008.
PCT/US2008/068597 International Search Report dated Nov. 28, 2008.
PCT/US2008/068597 International Written Opinion dated Nov. 28, 2008.
PCT/US2008/068870 International Search Report dated Nov. 28.
PCT/US2008/068870 International Written Opinion dated Nov. 28.
SU 41858 A1—English abstract translation obtained from McElroy Translation on Aug. 10, 2012, 1 page.
SU 238143 A1—English abstract translation obtained from McElroy Translation on Aug. 10, 2012, 1 page.
SU 1648807 A1—English machine translation obtained using Google Translate (http://translate.google.com) on Apr. 9, 2012, 3 pages.
SU 1708666 A1—English abstract translation obtained from McElroy Translation on Aug. 10, 2012, 1 page.
RU 2176954 C1—English abstract obtained from Espacenet (http://worldwide.espacenet.com) on Apr. 9, 2012, 1 page.
FR634317A—English machine translation obtained from Espacenet (http://worldwide.espacenet.com) on Dec. 5, 2012, 4 pages.
FR1203408A—English machine translation obtained from Espacenet (http://worldwide.espacenet.com) on Dec. 5, 2012, 4 pages.
FR1226595A—English machine translation obtained from Espacenet (http://worldwide.espacenet.com) on Jan. 28, 2013, 4 pages.
FR1287560A—English machine translation obtained from Espacenet (http://worldwide.espacenet.com) on Jan. 28, 2013, 4 pages.
DE1141552B—English machine translation obtained from Google Translate (http://translate.google.com) on Jan. 11, 2013, 4 pages.
DE1244003B—English machine translation obtained from Espacenet (http://worldwide.espacenet.com) on Oct. 15, 2012, 4 pages.
DE1912469A1—English machine translation obtained from Espacenet (http://worldwide.espacenet.com) on Jan. 28, 2013, 6 pages.
EP0025180A2—English abstract and machine translation obtained from Espacenet (http://worldwide.espacenet.com) on Jan. 28, 2013, 8 pages.
DE3515944A1—English abstract obtained from Espacenet (http://worldwide.espacenet.com) on Jan. 25, 2013, 1 page.
JP63041209A—English abstract and machine translation obtained from Espacenet (http://worldwide.espacenet.com) on Jan. 8, 2013, 23 pages.
EP0353313A1—English abstract and machine translation obtained from Espacenet (http://worldwide.espacenet.com) on Jan. 23, 2013, 8 pages.
JP-H07-137155-A—English abstract and machine translation obtained from Patent Abstract of Japan (http://www19.ipdl.inpit.go.jp) on Oct. 11, 2012, 5 pages.
NL9302004A—English abstract obtained from Espacenet (http://worldwide.espacenet.com) on Oct. 15, 2012, 1 page.
JP-H07-172123-A—English abstract and machine translation obtained from Patent Abstract of Japan (http://www19.ipdl.inpit.go.jp) on Oct. 11, 2012, 7 pages.
JP8244124A—English abstract obtained from Espacenet (http://worldwide.espacenet.com) on Jan. 8, 2013, 2 pages.
JP2000-512230A—English machine translation obtained from Patent Abstracts of Japan (http://www4.ipdl.inpit.go.jp) on Jan. 8, 2013, 4 pages.
WO2006/094775A1—English abstract and machine translation obtained from Espacenet (http://worldwide.espacenet.com) on Jan. 28, 2013, 5 pages.

* cited by examiner

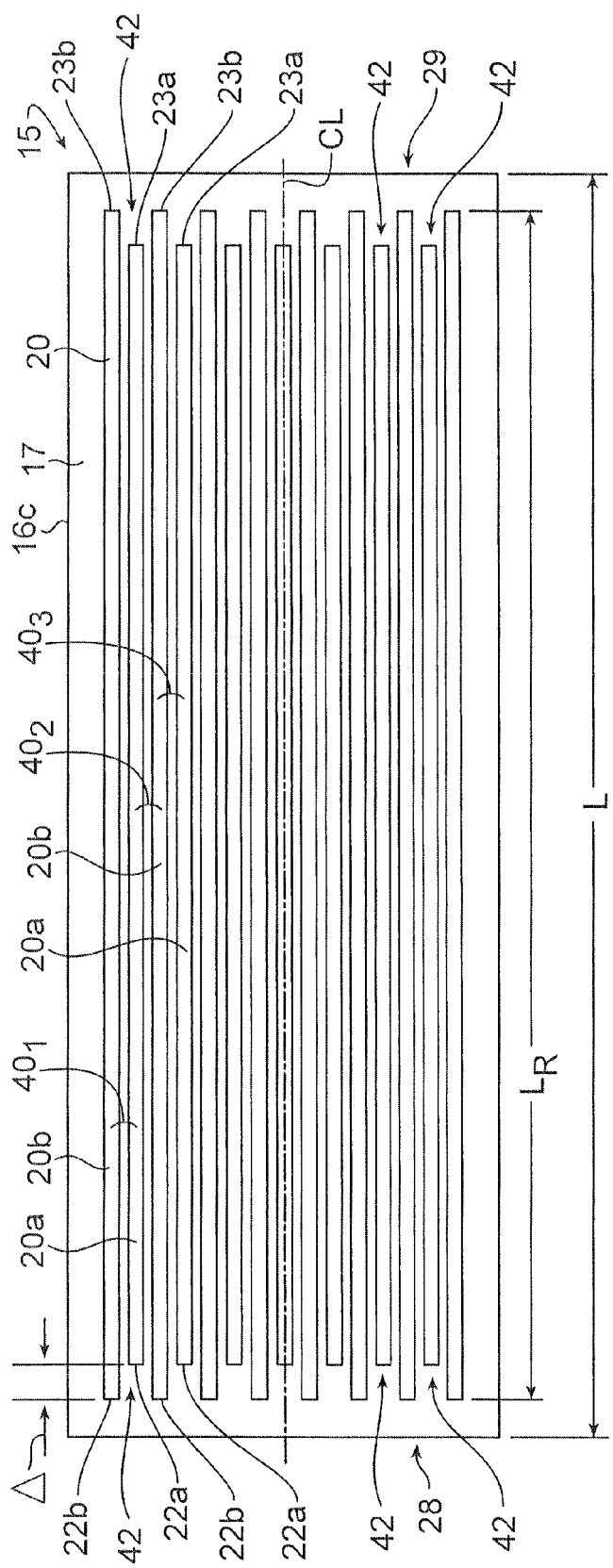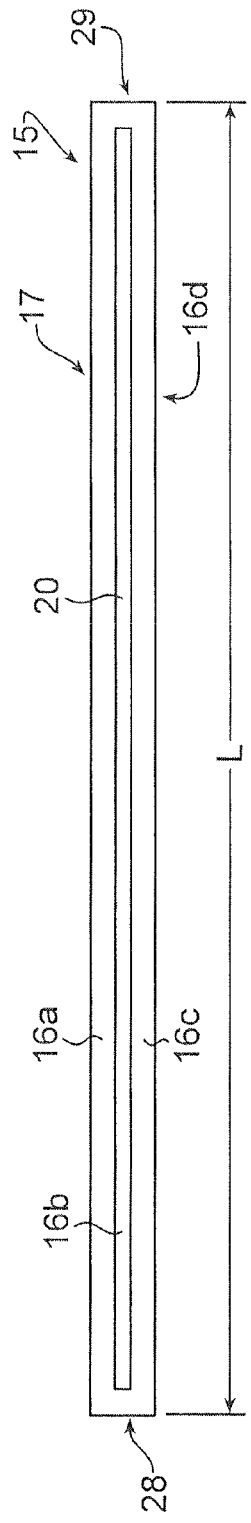

PATCH HAVING REINFORCEMENTS WITH STAGGERED ENDS

This application is a National Stage application of International Application No. PCT/US2008/068567, Jun. 27, 2008, to which this application claims priority and the benefit of the disclosure of which is also hereby incorporated by reference.

BACKGROUND OF THE INVENTION

1. Field of the Invention

This invention relates generally to tire repair patches having reinforcements, and, more specifically, to tire repair patches having axially offset or staggered reinforcement endings for application to a damaged area of a tire.

2. Description of the Related Art

Tires are known to be susceptible to becoming damaged. Such damage may occur when a tire encounters road debris, such as nails, glass, and stone, and during tire mounting and dismounting. Damage may also occur on the inside or outside of the tire, or may puncture the tire. Further, the damage may occur along the tread area, or along the sidewalls. In some instances, the damage may not penetrate the tire but weaken a particular area or region of the tire.

When repairing the damaged area of a tire, a patch is commonly used to cover and seal the damaged area. A patch may be made of various types of materials, such as, rubber, or other types of polymeric or elastomeric materials, and may include various reinforcements, such as cords and/or cables. In some applications, the patch may be adhesively affixed to or cured to the tire. Typically, the damaged area is prepped prior to application of the patch. For example, damaged material may be removed, and a surface may be buffed for receiving a patch. The buffed surface may also be cleansed prior to patch application. Subsequent steps may include applying an adhesive or cement prior to installing the patch.

At times, a tire patch may become detached from the tire, resulting in air loss. Detachment may arise from the formation of one or more separations at an edge of the tire patch. As a separation grows or propagates along a path, it may travel along the edge to form a crack. This often occurs in high stress or high deflection areas of the tire, such as the shoulder and sidewall areas of the tire. What is needed is a tire patch that better resists the formation and propagation of separations along one or more edges of the tire patch, especially in high stress areas of the tire.

SUMMARY OF THE INVENTION

One embodiment of the present invention includes a tire patch for repairing an associated vehicle tire. The tire patch includes a body configured to overlay a portion of the associated vehicle tire. It also includes a plurality of reinforcements received at least partially within the patch body, each reinforcement of the plurality having a first ending and a second ending.

In particular embodiments of the tire patch, the staggered arrangement of first endings includes one or more undulations. Other embodiments of the staggered arrangement of first endings include a plurality of undulations. Further embodiments of the staggered arrangement of first endings provide an alternating staggered arrangement of first reinforcement endings.

In further embodiments, the plurality of reinforcements include one or more pairs of adjacent reinforcements, each pair comprising a first reinforcement and a second reinforcement, wherein the first ending of the first reinforcement is axially offset with respect the first ending of the second reinforcement.

In other embodiments, the plurality of reinforcements includes a plurality of pairs of adjacent reinforcements, each pair comprising a first reinforcement and a second reinforcement, wherein the first ending of the first reinforcement is axially offset with respect the first ending of the second reinforcement.

In particular embodiments, the second ending of the first reinforcement is axially offset with respect the second ending of the second reinforcement to provide a staggered arrangement of second endings.

The foregoing and other objects, features and advantages of the invention will be apparent from the following more detailed descriptions of particular embodiments of the invention, as illustrated in the accompanying drawings wherein like reference numbers represent like parts of the invention.

BRIEF DESCRIPTION OF THE DRAWINGS

FIG. 2 is a top sectional view of the tire repair patch shown in FIG. 1, according to embodiments of the present invention.

FIG. 3 is a cross-sectional view of the tire repair patch shown in FIG. 2 along centerline CL.

DETAILED DESCRIPTION OF PARTICULAR EMBODIMENTS

Figure 1:
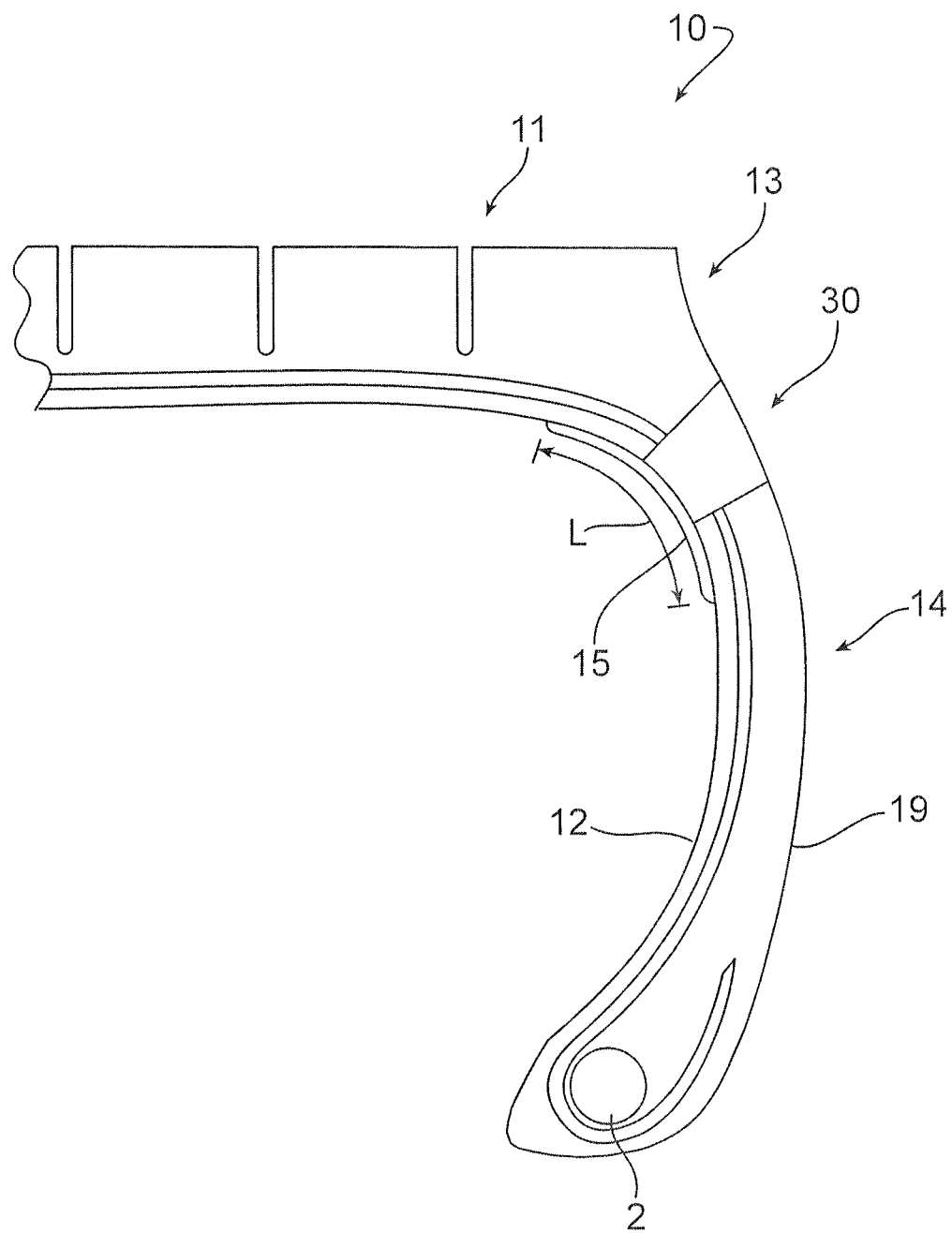
FIG. 1 is a partial cross sectional view of a tire having a tire patch applied to an interior surface of the tire according to an embodiment of the invention.

Particular embodiments of the present invention provide devices for repairing the damaged area of a tire 10. The devices include a tire repair patch 15 having a plurality of reinforcements 20 having endings 22, 23 that are positioned in a staggered or offset arrangement with respect to each other and/or the edge of the tire patch 15.

Tires 10 are known to be constructed from reinforcements, such as cords or cables, arranged and cured within elastomeric material, such as natural or synthetic rubber. Accordingly, a tire is susceptible to becoming damaged at any location along the tire, including locations along the tread 11, shoulders 13, and sidewalls 14. Damage may be caused by the penetration of an object, such as a nail, glass, or stone. Damage may form a scratch, abrasion, cavity, or laceration, which may arise, for example, from road debris, curbs, tire mounting or dismounting, or accidents. The damaged area may include damage to the tire reinforcements, or may simply penetrate the elastomeric material, each of which may compromise the integrity of the tire and render the tire unusable in many circumstances until repaired.

The tire patches 15 of the present invention are generally applied to the tire 10, so to cover or span the damaged area for the purpose of sealing and/or providing additional reinforcement to the tire 10. FIG. 1 shows a cross sectional view of a tire 10 having a tire patch 15 applied to an interior surface 12 of the tire, adjacent a damaged portion 30. Usually such repairs are affected on an interior surface 12 of the tire 10, although it is contemplated that patches 15 may be applied to any other surface of the tire, including an exterior surface 19.

Figure 4:
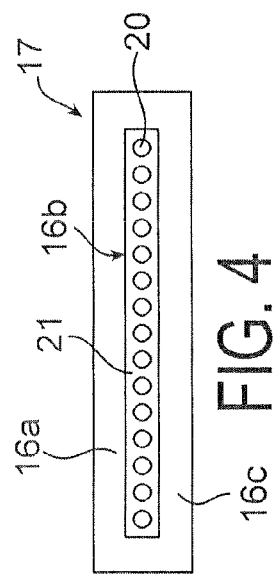
FIG. 4 is a sectional end view of a tire repair patch according to an embodiment of the invention, such as the repair patch shown in FIG. 3.

Referencing FIGS. 2 through 4, a tire patch 15 generally includes a patch body 17 and a plurality of reinforcements 20 extending lengthwise in patch 15. In particular embodiments, including those shown in the FIGURES, reinforcements 20 extend between opposing ends 28, 29 of the tire patch 15. The plurality of reinforcements 20 are arranged to form an edge having a staggered arrangement of reinforcement endings 22 or 23. In particular embodiments, at least one end 28, 29 of tire patch 15 includes a plurality of respective reinforcement endings 22, 23 arranged in a staggered arrangement. Ends 28, 29 generally form a patch edge that may extend in a linear, arcuate, curvilinear, alternating, or arbitrary path. It is contemplated that the arrangement of reinforcement endings 20 do not have to occur at a patch end 28, 29, and may instead be located at a more internal location within patch 15.

Reinforcements 20 may comprise any material known in the art, which includes cables formed of metal, such as steel, cords formed of any textile, such as aramid, polyester, nylon, or rayon, or any other reinforcement known in the art. The reinforcements 20 may be any length, extend in any direction relative to patch 15, and be spaced apart at any desired interval. In particular embodiments, as shown in the FIGURES, reinforcements 20 are arranged in a spaced-apart, side-by-side (i.e., adjacent) arrangement. In particular embodiments, reinforcements 20 are arranged laterally juxtaposed to each other, or, in other words, arranged lengthwise in a parallel arrangement. In one particular embodiment, the reinforcements 20 are bound together in a substrate 21 of material, as generally shown in FIG. 4, and more specifically shown in FIGS. 8A-8D, in various embodiments to form a reinforcement layer. Substrate 21 may be formed from a material similar to that of patch body 17. More specifically, the substrate 21 may comprise of a thin layer of polymeric material extending between the reinforcements 20 and forming a skin around the reinforcements 20. The substrate 21 may be comprised of rubber or any other elastomeric material. Accordingly, the reinforcements 20 and substrate 21 may comprise a ply of material making up the reinforcement layer 16b. It is contemplated that more than one reinforcement layer 16b may exist in patch 15, each of which may include a staggered arrangement of reinforcement endings 22, 23. Additional reinforcement layers 16b may be arranged to provide reinforcements 20 positioned at any angle relative to other reinforcements 20 associated with patch 15 or other reinforcement layers 16b. It is also contemplated that a plurality of additional reinforcements 20 may be provided in a single layer 16b, where a first and second plurality of reinforcements 20 is provided, such that the second plurality of reinforcements 20 is arranged in lengthwise or parallel alignment relative to the first plurality of reinforcements 20, or is arranged at an angle relative to the first plurality of reinforcements 20, and therefore, the second plurality may either overlay the first plurality of reinforcements or may be interwoven with the first plurality of reinforcements.

It is understood that tire patch 15 having one or more ends 28, 29 containing a staggered arrangement of reinforcement endings 22, 23 may otherwise comprise any patch known in the art. Accordingly, such patch 15 may be formed and constructed according to any method and manner known in the art. Further, patch 15 may be formed into any arbitrary or geometric shape, such as, for example, a polygon, a circle, or an ellipse. In one embodiment, the tire patch 15 includes at least three layers, which includes a reinforcement layer 16b, a bottom cushion layer 16c, and a top cushion layer 16a. In other embodiments, top and/or bottom layers may not exist, and/or additional reinforcement layers may exist. In constructing tire patch 15, the layers 16 may be stacked one on top of the other with the reinforcing layer 16b being arranged therebetween. In this way, the top 16a and bottom 16c layers comprise the patch body 17. Each of the layers 16 may be cured, cemented or adhesively affixed, or otherwise joined together by any manner suitable for use with the materials selected to construct the layers 16. In one particular embodiment, the fourth adhesive layer 16d may be applied to the bottom layer 16c and may comprise a chemical adhesive of any known type adapted for bonding the tire patch 15 to the rubber tire 10. It is noted that, in one embodiment, when the tire patch 15 is installed onto the tire 10, the reinforcements 20 may be arranged to extend lengthwise in a substantially radial direction between the beads 2 of the tire 10, such as, for example, when applying patch 15 to a radial (radially biased) tire. It is contemplated, however, in other embodiments, that such reinforcements 20 may extend in any other desired direction relative to the tire 10.

With reference generally to FIGS. 2 through 7, various embodiments of a patch 15 having an end 28, 29 containing a staggered arrangement of reinforcement endings 22, 23 are shown, even though it is contemplated that the staggered arrangement may be instead located more internally away from an end 28, 29 of patch 15. In one embodiment, a staggered arrangement of endings 22, 23 includes a plurality of steps or offsets ($\Delta$) between adjacent reinforcement endings 22 or 23. In other words, a staggered arrangement of reinforcement endings 22 and/or endings 23 of the plurality of reinforcements 20 includes two or more (i.e., a plurality of) adjacent pairs of reinforcements 20a, 20b, wherein each corresponding pair of endings 22a, 22b and/or endings 23a, 23b are staggered by an offset distance $\Delta$. Offset distance $\Delta$ may be any desired distance. In particular embodiments, offset distance $\Delta$ is at least 5 millimeters (mm). In other embodiments, offset $\Delta$ is at least 10-15 mm. In still other embodiments, offset $\Delta$ is at least 15 mm. Although each arrangement of reinforcement endings 22, 23 are shown in a staggered arrangement in the FIGURES, it is contemplated that one arrangement of endings 22 or 23 may staggered, while the other is linear or otherwise non-staggered. Each pair of staggered endings 22a, 22b and 23a, 23b may be separated by one or more intervening reinforcement endings 22 or 23, which are generally aligned with adjacent endings 22 or 23 to provide a local non-staggered arrangement of endings 22 or 23, such as is shown generally in FIGS. 6 and 8C. It is also contemplated that two adjacent pairs of staggered reinforcement endings 22, 23 may share an ending 22 or 23, such as is shown in FIG. 2 for example, where adjacent reinforcement pairs $40_1$ and $40_2$ having staggered endings 22, 23 share endings 22a and 23a, while pairs $40_2$ and $40_3$ share endings 22b and 23b.

A staggered arrangement of endings 22, 23 may also be described as providing one or more undulations 42. Specifically, two or more pairs of staggered endings 22, 23 may result in an undulation 42, which generally comprises a discontinuity along an arrangement of endings 22, 23 that may form a recess or protrusion comprising one or more endings 22, 23. Generally, an undulation 42 is associated with two pairs of adjacent reinforcement endings 22, 23, wherein the first pair provides an offset Δ in a direction inward or outward patch 15 and the subsequent pair provides an offset Δ extending in the other direction, so that an inward-outward or outward-inward undulation is provided. For example, in FIGS. 2 and 5, each ending 22, 23 forms an undulation 42 because the patch 15 includes a 1×1 alternating arrangement of endings 22a, 22b and 23a, 23b, respectively. FIG. 6 generally shows a single undulation 42 forming a recess along the staggered arrangement of reinforcements 22, while two undulations are provided in FIG. 7, With reference to FIGS. 8A-8D, recessed and protruding undulations 42 are shown. An undulation 42 may or may not be symmetrical, meaning that the two offset distances Δ may not be equal. Also, an undulation 42 may comprise two or more offsets Δ. For example, the undulations 42 in FIGS. 2 and 5 each include three (3) reinforcement endings 22 or 23 (i.e., 22a, 22b, 22a or 23b, 23a, 23b) while the undulations 42 in FIGS. 6-7 utilize five (5) reinforcement endings 22 (in FIG. 5, each undulation 42 comprises a 22b, 22a, 22b, 22a, 22b arrangement). The undulations 42 of FIGS. 8A-8C are each formed from four (4) reinforcement endings 22 or 23. In particular embodiments, a staggered arrangement comprises an alternating arrangement of endings 22 or 23, when generally including a plurality of undulations 42. An alternating arrangement of endings is generally shown in various embodiments in FIGS. 2, 5, 7, and 8A-8D. The alternating staggered arrangement may be arbitrary or systematic and continuous or intermittent, such as along a width of patch 15.

In particular embodiments, the staggered arrangement of endings 22, 23 includes endings that are each positioned axially along a lengthwise direction of the corresponding reinforcement 20. Accordingly, reinforcements 20 are longitudinally displaced with respect to other reinforcements 20. In particular, the ends of particular reinforcements 20 may be longitudinally displaced with respect to each other as measured from a plane perpendicularly intersecting the longitudinal or axial axis of reinforcements 20, such as a linear end 22, 23 of patch 15. For purposes of discussion, longitudinal displacement is also termed axial displacement.

With continued reference to the FIGURES, the reinforcements 20 have a length $L_R$ that defines first 22 and second 23 respective reinforcement ends. In one particular embodiment, to achieve a staggered arrangement of endings 22, 23, an end 22a of a first reinforcement 20a may be longitudinally displaced with respect to end 22b of second reinforcement 20b, such as by distance Δ. The offset reinforcements 20a, 20b may be directly adjacent to each other. In particular embodiments, each adjacently positioned reinforcement 20a, 20b may be offset with respect to the prior reinforcement 20, such as is shown in FIGS. 2, 5, 7, 8A, and 8B. It is contemplated that not all of the adjacently positioned reinforcements 20a, 20b need necessarily be offset, such as is shown in a particular embodiment in FIG. 6. Accordingly, two pairs of offset adjacent reinforcements 20a, 20b, may be provided, where one or more reinforcements 20 are placed between the two pairs, as shown in example in FIG. 6. As such, the tire patch 15 may include particular reinforcements 20 where ends 22 are aligned, i.e., not axially offset. Referring to the distal side of the tire patch 15, in a similar manner, respective ends 23a, 23b of the reinforcements 20a, 20b may also be axially offset by the same or different amounts. In this manner, the reinforcements 20 of the tire patch 15 are unevenly spaced or staggered in the axial direction.

Figure 5:
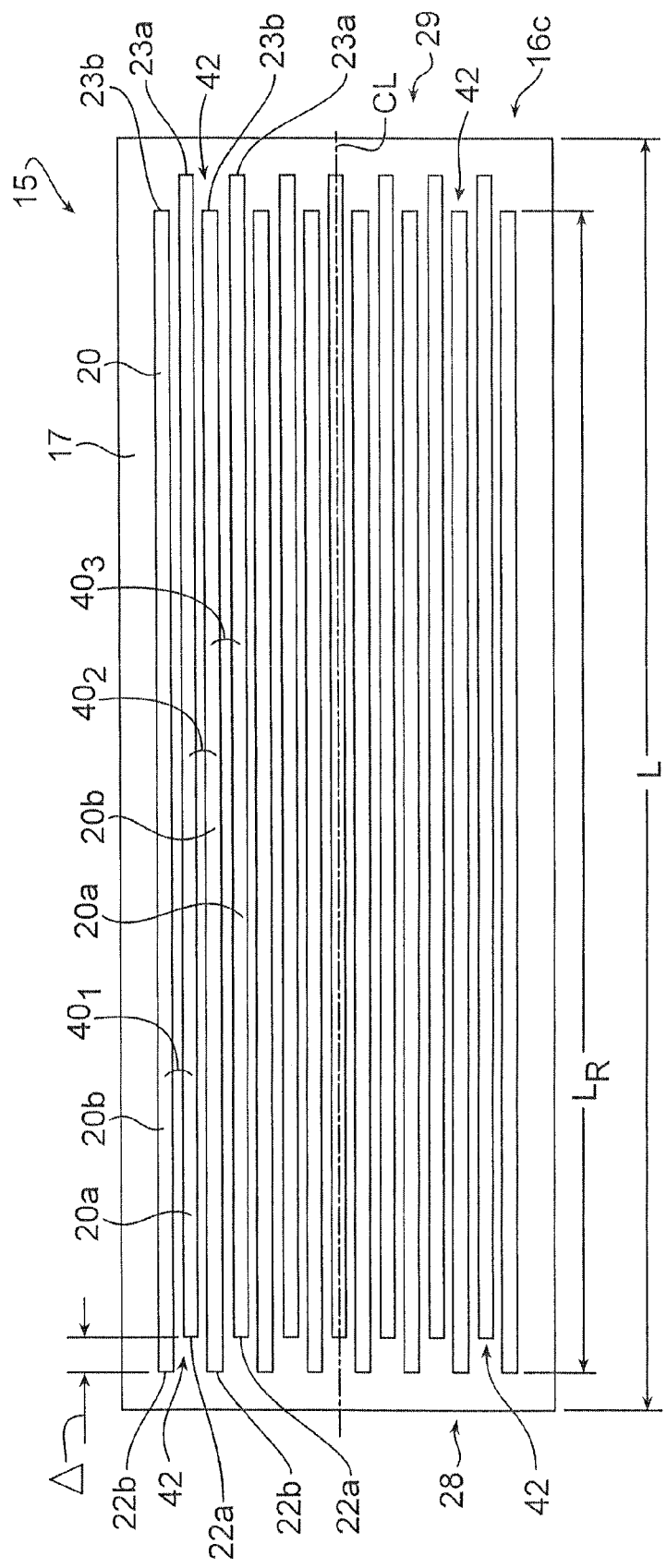
FIG. 5 is a top sectional view of a tire patch, according to an embodiment of the invention, wherein reinforcements having similar lengths are shifted axially to provide a staggered arrangement of endings at opposing ends of the patch.
Figure 6:
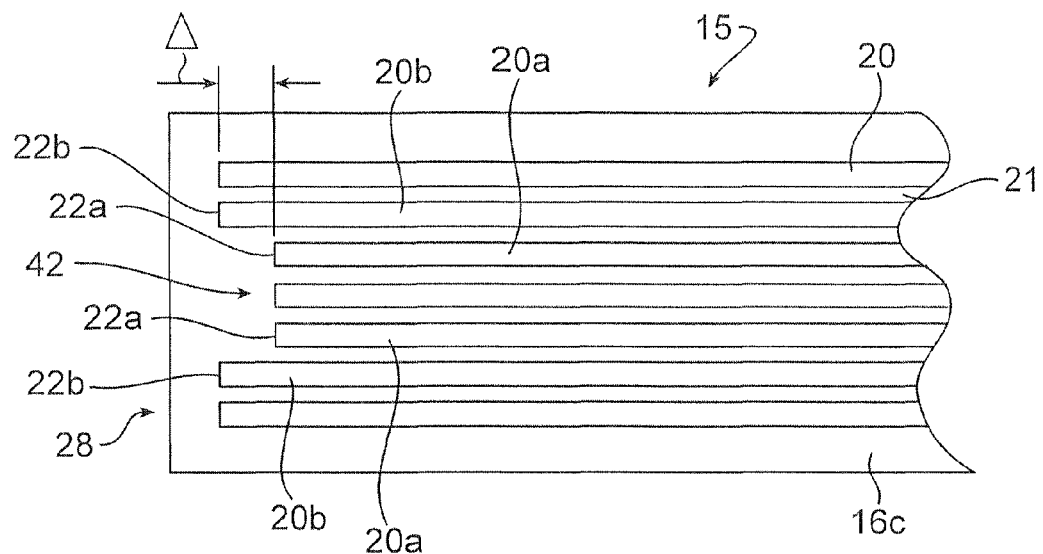
FIG. 6 is a partial top sectional view of the tire repair patch in accordance with an embodiment of the invention.

In particular embodiments, such as shown in FIG. 5, stagger arrangements of endings 22, 23 may be achieved when the length $L_R$ of individual reinforcements 20 are substantially identical. Accordingly, the offset Δ between reinforcements 20 may be implemented by axially shifting one reinforcement 20a with respect to another reinforcement 20b. In this embodiment, it will be realized that the offset on one side of the tire patch 15 is directly proportional to the offset on the distal side of the tire patch 15. Stating it another way, the midpoints of each of the respective reinforcements 20a, 20b will be offset from each other when compared to a centerline axis of the tire patch 15. In another embodiment, however, the length $L_R$ of one reinforcement 20a may differ with respect to the length $L_R$ of another reinforcement 20b, such as shown is in FIG. 2. Axial displacement may thus be implemented by aligning the midpoints of the reinforcements 20a, 20b, where the difference in reinforcement lengths will generally be directly proportional to offset $\Delta_1$. It is to be construed that any manner of axially displacing the reinforcements 20 within the tire patch 15 may be chosen with sound engineering judgment.

Figure 7:
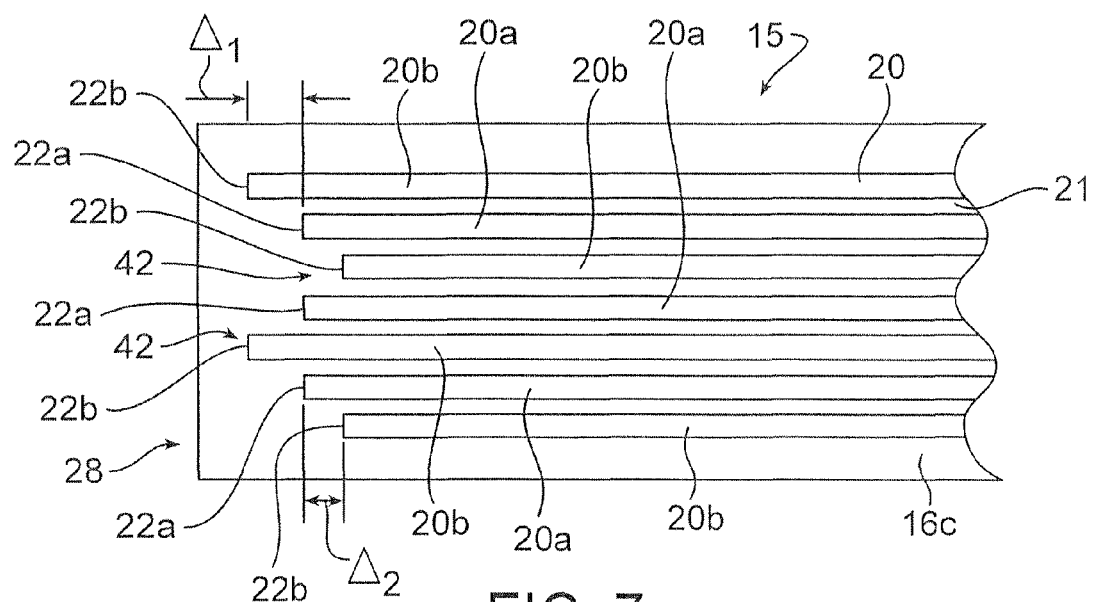
FIG. 7 is a partial top sectional view of the tire repair patch in accordance with another embodiment of the invention.
Figure 8A:
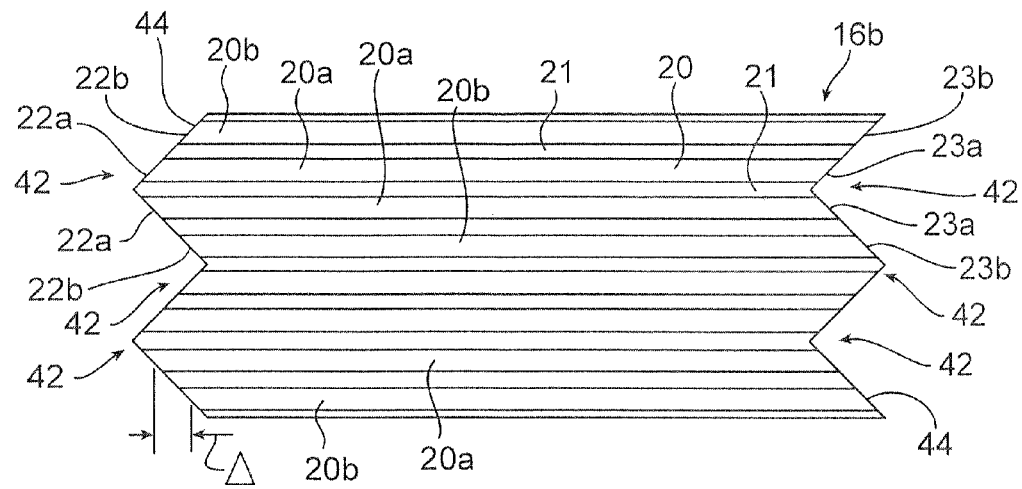
FIG. 8A is an embodiment of the present invention showing the reinforcing layer of the tire repair patch having a profiled end forming a staggered arrangement of reinforcement endings, in accordance with an embodiment of the invention.
Figure 8B:
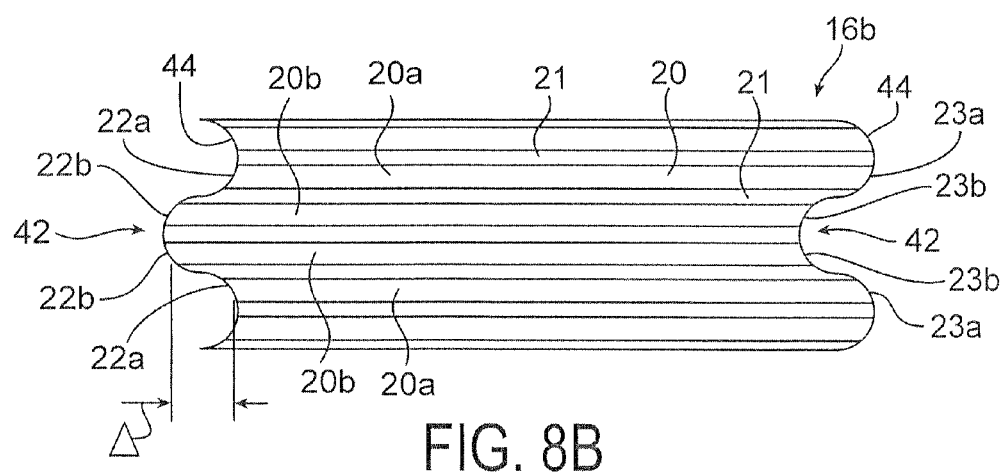
FIG. 8B is another embodiment of the present invention showing the reinforcing layer of the tire repair patch having a profiled end forming a staggered arrangement of reinforcement endings, in accordance with an embodiment of the invention.
Figure 8C:
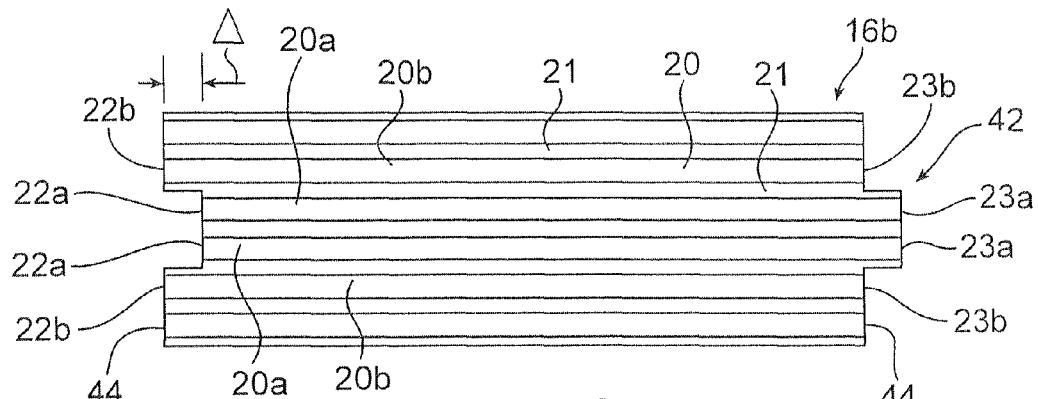
FIG. 8C is yet another embodiment of the present invention showing the reinforcing layer of the tire repair patch having a profiled end forming a staggered arrangement of reinforcement endings, in accordance with an embodiment of the invention.

Referencing FIGS. 6 and 7, the offset between multiple sets of adjacently positioned reinforcements 20 may vary. In one particular embodiment, the offset between one set of adjacently positioned reinforcements 20 may be substantially zero, while that of another set may be significantly greater than zero, designated by Δ. It is noted that any pattern of fashioning the variation in offsets may be chosen without departing from the intended scope of coverage of the embodiments of the subject invention. In FIG. 7, the offset spacing of a first set of adjacently positioned reinforcements 20 may be non-zero and so have a value designated by $\Delta_1$. Subsequently positioned sets of reinforcements 20 may be offset by a different amount, shown generally at $\Delta_2$, which may be greater or less than the first offset $\Delta_1$. The amount of each offset Δ may range from between 0 inch to 0.5 inch. Although any size offset may exist, offsets greater than 0.5 inch may be selected without departing from the intended scope of coverage of the embodiments of the subject invention. It will be appreciated by persons of ordinary skill in the art that any number of axially displaced sets of cords and any difference in axial displacement between cords may be chosen as is suitable for repairing damaged tires 10.

Figure 8D:
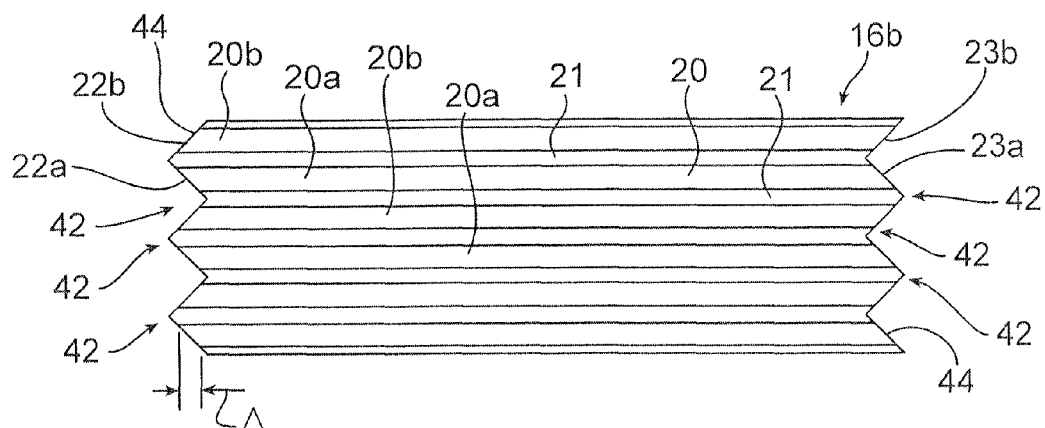
FIG. 8D is an embodiment of the present invention showing the reinforcing layer of the tire repair patch having a profiled end forming a staggered arrangement of reinforcement endings, in accordance with an embodiment of the invention.

With reference now to FIGS. 8A through 8D, the reinforcement layer 16b formed along its ends to achieve a staggered arrangement of reinforcement endings 22, 23. In one embodiment, the staggered end of a reinforcement layer 16b may be formed by cutting or shearing a profile or path along an end of the layer. Particular embodiments include any linearly staggered or alternating edge 44, which may form a zigzag path as shown generally in FIGS. 8A and 8D, or a path representing a step function, as shown generally in FIG. 8C. In FIG. 8D, the staggered arrangement is provided by adjacent pairs of endings 22, 23 having the angled cross-cut, so to provide an undulation 42 or offset Δ. Other embodiments of edge 44 include curvilinear paths, as shown in FIG. 8B, and any other path, whether patterned or arbitrary and continuous or intermittent. Other embodiments contemplate curved edges 44 or combinations of straight and curved edges 44, of which any radius may be chosen. Still another embodiment may include irregularly or arbitrarily shaped edges 44. Still, the reinforcement layer edge 44 may be fashioned having any contour. It will be readily seen that the ends 22, 23 of the reinforcements 20 may extend all of the way up to the edges of the reinforcement layer 16b, thereby substantially traversing the entire length $L_R$ of the reinforcement layer 16b. Changes in the substrate edge may therefore be either abrupt or gradual as determined by the offset of each reinforcement 20 within the reinforcing layer 16b. In one particular embodiment, the edge pattern may be scalloped including straight or curved undulations. However, any edge pattern may be chosen as is appropriate for use with the particular embodiments of the present invention.

It is noted that the distal edges of the reinforcing layers 16b, and/or the arrangement of reinforcements 20 and endings 22, 23 within a patch 15, may be aligned or arranged symmetrically or asymmetrically about a lateral or longitudinal centerline of reinforcing layer 16b and/or patch 15. In a symmetrical alignment, the reinforcement endings 22, 23 are equidistant from a transverse centerline axis, as illustrated in FIG. 2. Conversely, the distance between distal edges of the substrate when measured from the transverse centerline axis is different for asymmetrically configured patterns, such as is shown in FIGS. 8A-8D. All such variations are to be construed as falling within the scope of coverage of the embodiments of the present invention.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A tire patch for repairing an associated vehicle tire, comprising:
 a patch body configured to overlay a portion of the associated vehicle tire, the patch body being defined by a width and a length extending traverse to the width between a pair of opposing ends, the patch body including a longitudinal centerline extending across the patch body width perpendicular to the patch body length;
 a plurality of reinforcements received at least partially within the patch body to form a single layer of reinforcements arranged within the patch body thickness, the single layer of reinforcements comprising a single ply of material comprising the plurality of reinforcements arranged within an elastomeric substrate, each of the plurality of reinforcements having a length extending between a first reinforcement ending and a second reinforcement ending such that each of the first reinforcement ending and the second reinforcement ending is directed away from the other of the first reinforcement ending and the second reinforcement ending and the longitudinal centerline of the patch body,
 wherein the length of each reinforcement of the plurality of reinforcements extends in a direction of the patch body length between the pair of opposing ends of the patch body,
 wherein the plurality of reinforcements are arranged in a spaced apart, side-by-side arrangement in the direction of the width of the patch body such that the first reinforcement endings are arranged in a staggered arrangement whereby the arrangement of first reinforcement endings are arranged to extend in the direction of the patch body width such that adjacent first reinforcement endings of a first reinforcement and a second reinforcement of each of two or more adjacent pairs of reinforcements of the plurality of reinforcements are offset a distance relative each other in a direction of the patch body length such that the adjacent first reinforcement endings of the first reinforcement and second reinforcement of each of two or more adjacent pairs of reinforcements are arranged different distances from the longitudinal centerline of the patch to form one or more undulations along the staggered arrangement of first reinforcement endings.

2. The tire patch of claim 1, wherein the staggered arrangement of first endings comprises an alternating, staggered arrangement including a plurality of undulations of first reinforcement endings.

3. The tire patch of claim 1, wherein the offset is at least 5 mm.

4. The tire patch of claim 1, wherein the offset is at least 10 mm.

5. The tire patch of claim 1, wherein the length of each reinforcement of the plurality of reinforcements is substantially the same length.

6. The tire patch of claim 1, wherein the single reinforcement layer is interposed between a top cushion layer and a bottom cushion layer.

7. The tire patch of claim 6 further comprising an adhesive layer arranged along an outer surface of the bottom cushion layer.

8. The tire patch of claim 1, wherein the plurality of reinforcements are arranged in parallel in the spaced-apart, side-by-side arrangement.

9. The tire patch of claim 1, wherein the plurality of reinforcements are arranged in a spaced apart, side-by-side arrangement in the direction of the width of the patch body such that the second reinforcement endings are arranged in a staggered arrangement whereby the arrangement of second reinforcement endings are arranged to extend in the direction of the patch body width such that adjacent second reinforcement endings of the first reinforcement and a second reinforcement of each of two or more adjacent pairs of reinforcements the plurality of reinforcements are offset a distance relative each other in a direction of the patch body length such that the adjacent second reinforcement endings of the first reinforcement and second reinforcement of each of two or more adjacent pairs of reinforcements are arranged different distances from the longitudinal centerline of the patch to form one or more undulations along the staggered arrangement of second reinforcement endings.

10. The tire patch of claim 9, wherein the first reinforcement endings and the second reinforcement endings are arranged asymmetrically with respect to each other relative the patch longitudinal centerline, such that the distance between the first reinforcement ending and the longitudinal centerline of the patch body is different from the distance between the second reinforcement ending relative the longitudinal centerline of the patch body for each reinforcement.

11. The tire patch of claim 1, wherein the undulation of first reinforcement endings is formed by four or more first reinforcement endings.

12. The tire patch of claim 1, where the first reinforcement endings are arranged along an edge of the ply.

13. The tire patch of claim 1, where the first reinforcement endings are arranged along an edge of the patch body.

14. A patched tire comprising:
a tire having an interior surface and an exterior surface;
a tire patch applied to one of the interior surface and the exterior surface, the patch comprising:
a patch body configured to overlay a portion of the associated vehicle tire, the patch body being defined by a width and a length extending traverse to the width between a pair of opposing ends, the patch body including a longitudinal centerline extending across the patch body width perpendicular to the patch body length;
a plurality of reinforcements received at least partially within the patch body to form a single layer of reinforcements arranged within the patch body thickness, the single layer of reinforcements comprising a single ply of material comprising the plurality of reinforcements arranged within an elastomeric substrate, each of the plurality of reinforcements having a length extending from a first reinforcement ending to a second reinforcement ending, between the pair of opposing ends of the patch body, and substantially perpendicular to the longitudinal centerline of the patch body such that each of the first reinforcement ending and the second reinforcement ending is directed away from the other of the first reinforcement ending and the second reinforcement ending and the longitudinal centerline of the patch body,
wherein the length of each reinforcement of the plurality of reinforcements extends in a direction of the patch body length between the pair of opposing ends of the patch body,
wherein the plurality of reinforcements are arranged in a spaced apart, side-by-side arrangement in the direction of the width of the patch body such that the first reinforcement endings are arranged in a staggered arrangement whereby the arrangement of first reinforcement endings are arranged to extend in the direction of the patch body width such that adjacent first reinforcement endings of a first reinforcement and a second reinforcement of each of two or more adjacent pairs of reinforcements of the plurality of reinforcements are offset a distance relative each other in a direction of the patch body length such that the adjacent first reinforcement endings of the first reinforcement and second reinforcement of each of two or more adjacent pairs of reinforcements are arranged different distances from the longitudinal centerline of the patch to form one or more undulations along the staggered arrangement of first reinforcement endings.

15. The tire patch of claim 14, wherein the plurality of reinforcements are arranged in a spaced apart, side-by-side arrangement in the direction of the width of the patch body such that the second reinforcement endings are arranged in a staggered arrangement whereby the arrangement of second reinforcement endings are arranged to extend in the direction of the patch body width such that adjacent second reinforcement endings of the first reinforcement and a second reinforcement of each of two or more adjacent pairs of reinforcements the plurality of reinforcements are offset a distance relative each other in a direction of the patch body length such that the adjacent second reinforcement endings of the first reinforcement and second reinforcement of each of two or more adjacent pairs of reinforcements are arranged different distances from the longitudinal centerline of the patch to form one or more undulations along the staggered arrangement of second reinforcement endings.

16. The tire of claim 14, wherein the plurality of reinforcements are arranged in parallel in the spaced-apart, side-by-side arrangement.

17. The tire of claim 14, wherein the staggered arrangement of first endings comprises an alternating, staggered arrangement including a plurality of undulations of first reinforcement endings.

18. The tire of claim 14, the tire having original reinforcements extending in a radial direction of the tire,
wherein the length of each reinforcement of the plurality of reinforcements extend in substantially the same radial direction as the original reinforcements.

19. The tire of claim 14, where the first reinforcement endings are arranged along an edge of the ply.

20. The tire of claim 14, where the first reinforcement endings are arranged along an edge of the patch body.

* * * * *